(12) United States Patent
Hoelen et al.

(10) Patent No.: US 6,536,914 B2
(45) Date of Patent: Mar. 25, 2003

(54) ILLUMINATION SYSTEM, LIGHT MIXING CHAMBER AND DISPLAY DEVICE

(75) Inventors: Christoph Gerard August Hoelen, Eindhoven (NL); Gerard Harbers, Best (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/846,421

(22) Filed: May 1, 2001

(65) Prior Publication Data
US 2001/0046131 A1 Nov. 29, 2001

(30) Foreign Application Priority Data
May 4, 2000 (EP) .............................................. 00201606

(51) Int. Cl.[7] ................................................ F21V 9/00
(52) U.S. Cl. .......................... 362/231; 362/31; 362/230; 362/246; 362/545; 362/558; 362/800
(58) Field of Search ........................ 362/231, 31, 230, 362/246, 545, 558, 800, 27; 349/68, 69

(56) References Cited

U.S. PATENT DOCUMENTS

| | | | |
|---|---|---|---|
| 5,613,751 A | | 3/1997 | Parker et al. ................... 362/31 |
| 5,883,684 A | * | 3/1999 | Millikan et al. ............... 349/65 |
| 5,921,652 A | * | 7/1999 | Parker et al. ................. 362/231 |
| 6,036,328 A | * | 3/2000 | Ohtsuki et al. ................ 362/31 |
| 6,132,072 A | * | 10/2000 | Turnbull et al. ............. 362/230 |
| 6,285,420 B1 | * | 9/2001 | Mizumo et al. ............... 349/65 |
| 6,315,440 B1 | * | 11/2001 | Satoh ........................ 362/561 |
| 6,351,594 B1 | * | 2/2002 | Nakamura et al. ........... 362/558 |
| 6,357,903 B1 | * | 3/2002 | Furusawa et al. ............ 358/475 |

FOREIGN PATENT DOCUMENTS

JP      2000036209 A  *  2/2000   ............. F21V/8/00

OTHER PUBLICATIONS

Patent Abstracts of Japan, vol. 2000, No. 05, Sep. 2000,JP 2000 036209 A.
Patent Abstracts of Japan, vol. 2000, No. 07, Sep. 2000, JP 2000 100231 A.

* cited by examiner

*Primary Examiner*—Sandra O'Shea
*Assistant Examiner*—James W Cranson

(57) ABSTRACT

An illumination system for illuminating a display device (3) comprises a light-emitting panel (1) having a light-emission window (2) and at least one edge surface (4) for coupling light into the light-emitting panel (1). The illumination system further comprises a light mixing chamber (5) provided with a light source (6). The light mixing chamber (5) is associated with the edge surface (4). According to the invention, the light source (6) comprises a plurality of clusters of light-emitting diodes (LEDs) having different light-emission wavelengths, the clusters being arranged at a pitch P with respect to each other. The ratio of the height H of the light mixing chamber (5) to the pitch P of the clusters meets the relation $0.1 \leq H/P \leq 10$, preferably $0.2 \leq H/P \leq 2$. Preferably, each cluster comprises one blue, one green and one red LED, or one blue, two green and one red LEDs. Preferably, each LED has a luminous flux of at least 5 lumen. The illumination system according to the invention has a very uniform light distribution, so that the display device is uniformly illuminated.

15 Claims, 11 Drawing Sheets

ILLUMINATION SYSTEM, LIGHT MIXING CHAMBER AND DISPLAY DEVICE

BACKGROUND OF THE INVENTION

1. The Field of the Invention

The invention relates to an illumination system having a light-emitting panel and a light mixing chamber for illuminating a display device.

2. Description of the Related Art

Such illumination systems are known per se and are alternatively referred to as edge-lighting systems. They are used, inter alia, as backlighting of (image) display devices, for example for television receivers and monitors. Such illumination systems can particularly suitably be used as a backlight for non-emissive displays, such as liquid crystal display devices, also referred to as LCD panels, which are used in (portable) computers or (cordless) telephones.

Typically, known display devices generally include a substrate provided with a regular pattern of pixels, which are each driven by at least one electrode. In order to reproduce an image or a datagraphic representation in a relevant area of a (display) screen of the (image) display device, the display device uses a control circuit. In an LCD device, the light originating from the backlight is modulated by a switch or a modulator, while applying various types of liquid crystal effects. In addition, the display may be based on electrophoretic or electromechanical effects.

In the known illumination systems, customarily a tubular low-pressure mercury-vapor discharge lamp, for example one or more compact fluorescent lamps, is used as the light source, the light which, in operation, is emitted by the light source being coupled into the light-emitting panel which serves as an optical waveguide. This optical waveguide generally forms a comparatively thin and flat panel which is made, for example, of a synthetic resin or glass, light being transported through the optical waveguide under the influence of (total) internal reflection.

Such an illumination system may also be provided with an alternative light source in the form of a plurality of optoelectronic elements, also referred to as electro-optic elements, such as electroluminescent elements, for example light-emitting diodes (LEDs). These light sources are generally provided in the proximity of or contiguous to a light-transmitting edge area of the light-emitting panel, so that, in operation, light originating from the light source is incident on the light-transmitting edge area and spreads in the panel.

U.S. Pat. No. 5,613,751 discloses an illumination system comprising a light-emitting panel and one or more light sources, which are arranged in a so-called light transition area which is coupled to or integral with the light-emitting panel, with the distribution of the light coupled out of the light-emitting panel to illuminate the display device being brought about by providing a suitable pattern of deformities in the light-emission window of the light-emitting panel.

An illumination system of the above-mentioned type has the disadvantage that the light distribution in the light-emitting panel, particularly in the proximity of the light source, is insufficiently uniform. As a result, the illumination uniformity of the display device is insufficient.

SUMMARY OF THE INVENTION

It is an object of the invention to completely or partly overcome the above-mentioned drawback. The invention more particularly aims at providing an illumination system, wherein the uniformity of the light distribution of the illumination system and hence the uniformity with which the display device is illuminated are improved.

In accordance with the invention, this object is achieved in that the light source comprises a plurality of clusters of light-emitting diodes having different light-emission wavelengths, said clusters being arranged at a pitch P with respect to each other, and the ratio between a height H of the light mixing chamber and the pitch P of the clusters of the light-emitting diodes meets the relation:

$$0.1 \leq H/P \leq 10,$$

the height H of the light mixing chamber being measured at right angles to the light-coupling edge area.

As the light-emitting diodes are clustered, mixing of the light-emitted by the light-mitting diodes (LEDs) is enhanced. An example of such a cluster is a combination of one lue LED, one green LED and one red LED. An alternative embodiment of such a cluster comprises one blue LED and one red LED in combination with two green LEDs. In addition to the above-mentioned color combinations, a cluster may comprise an amber LED.

The application of a light mixing chamber in accordance with the measure of the invention has the advantage that the light originating from the LEDs of different colors mixes well. A geometric ratio of the height of the light mixing chamber to the pitch of the clusters of LEDs in the range between said limits causes light originating from the LEDs, which is coupled into the light-emitting panel via the light-coupling edge area, to have been sufficiently mixed in the light mixing chamber when it is coupled out of the light emission window to uniformly illuminate the (image) display device.

The light mixing chamber in accordance with the invention is of simple construction and inexpensive to manufacture. This can be attributed, among other things, to the fact that it is not necessary to provide additional optical structures in the light mixing chamber to mix light originating from the LEDs of different colors. Such optical structures comprise optical elements which may, or may not, be provided with intricately curved surfaces which may, or may not, be provided with reflective coatings. Such optical elements are used to diffuse the light, emitted by the LEDs in the direction of the light-coupling edge area of the light-emitting panel, in directions along the longitudinal direction of the light mixing chamber, thereby enhancing the mixing of the light.

The lower limit of the ratio of the height of the light mixing chamber to the pitch of the clusters (H/P=0.1) is motivated by the fact that it is desirable that light beams originating from the LEDs of different colors in adjoining clusters at least touch each other at the location of the light-coupling edge area. The upper limit of the above-mentioned height/pitch ratio (H/P=10) is motivated by the fact that, in the absence of such an upper limit, (the height of) the light mixing chamber would become impracticably large and hence the edge of the (image) display device impracticably wide.

By virtue of the measure in accordance with the invention, the uniformity of the distribution of the light emitted by the illumination system is improved. As a result, a more uniform illumination of the (image) display device is obtained.

Preferably, the ratio between the height (H) of the light mixing chamber and the pitch (P) of the clusters meets the relation:

$$0.2 \leq H/P \leq 2.$$

The lower limit of the ratio between the height of the light mixing chamber and the pitch of the clusters (H/P=0.2) is motivated by the fact that it is desirable that light beams originating from LEDs of different colors in adjoining clusters demonstrate at least a 50% overlap at the location of the light-coupling edge area. As a result, the uniformity of the distribution of the light emitted by the illumination system is further improved. The upper limit of said height/pitch ratio (H/P=2) is dictated by the fact that, in the absence of such an upper limit, (the height of) the light mixing chamber becomes larger than the height customarily applied in (image) display devices.

The positioning of the LEDs with respect to each other in a cluster influences the way in which light issues from the light-emitting panels. A favorable embodiment of the illumination system in accordance with the invention is characterized in that the ratio between the height H of the light mixing chamber and the pitch P of the clusters of the light-emitting diodes meets the relation:

$$\frac{1}{2\tan\beta_{max}} \leq \frac{H}{P} \leq \frac{2}{\tan\beta_{max}},$$

where $\beta$ is the light emission angle of the light-emitting diode in a plane parallel to the longitudinal direction of the light mixing chamber and measured with respect to a longitudinal axis of the light-emitting diode, and where $\beta_{max}$ is the maximum value of $\beta$ at which the light-emitting diode emits, in operation, 90% of its energy for values of $\beta$ at which $|\beta| \leq \beta_{max}$.

The angle $\beta$ represents the aperture angle of the light which, in operation, is emitted by the LED in the longitudinal direction of the light mixing chamber. Within the limits for which it applies that $-\beta_{max} \leq \beta \leq \beta_{max}$ the LED emits, in operation, 90% of its light. As a result of said choice of the orientation of the angle $\beta$, the above-mentioned relation is given a measure regarding the degree of mixing of the various colors of light originating from the LEDs in adjoining clusters. If a certain cluster consists, by way of example, of a succession of one blue LED, one green LED and one red LED, and adjoining clusters have the same sequence of LEDs, it is desirable for the light originating from a LED of a certain color of said cluster to have a light distribution, upon reaching the light-coupling edge area, such that at least a part of the light beam of said LED coincides with the light originating from the light beam of the LED of the same color in the adjoining cluster.

The lower limit $2\tan(\beta_{max})=P/H$ in the above-mentioned formula is motivated by the fact that the light beams originating from LEDs of the same color in adjoining clusters at least contact each other at the location of the light-coupling edge area of the light-emitting panel. If said light beams do not contact each other, then there is a region on the light-coupling edge area where no direct light is incident of said color originating from LEDs of said color in said adjoining clusters. The upper limit $\tan(\beta_{max})=2P/H$ in the above-mentioned formula is motivated by the fact that it is sufficient if the light beam originating from a LED of a certain color in a cluster has a width such that, at the location of the light-coupling edge area, the light beam still emits light at a distance of twice the pitch of the clusters (2×P). In other words, the upper limit is attained at a light distribution of the LEDs at which the light emitted by an LED of a specific color in a cluster is such that the light beam of said LED contacts, at the location of the light-coupling edge area, a perpendicular line dropped from an LED of the same color in a cluster adjoining the adjoining cluster of LEDs. By virtue of said measure, the uniformity of the distribution of the light emitted by the illumination system is further improved.

An alternative, favorable embodiment of the illumination system in accordance with the invention is characterized in that the ratio between the height H and a width D of the light mixing chamber meets the relation:

$$\frac{1}{2\tan\alpha_{max}} \leq \frac{H}{D} \leq \frac{3}{\tan\alpha_{max}},$$

where D is the width of the light mixing chamber measured at right angles to the longitudinal direction of the light mixing chamber, where $\alpha$ is the light emission angle of the light-emitting diode in a plane transverse to the longitudinal direction of the light mixing chamber and measured with respect to a longitudinal axis of the light-emitting diode, and where $\alpha_{max}$ is the maximum value of $\alpha$ at which the light-emitting diode emits, in operation, 90% of its energy for values of $\alpha$ at which $|\alpha| \leq \alpha_{max}$.

The angle $\alpha$ represents the aperture angle of the light which, in operation, is emitted by the LED in a direction transverse to the longitudinal direction of the light mixing chamber. Within the limits for which it applies that $-\alpha_{max} \leq \alpha \leq \alpha_{max}$, the LED emits, in operation, 90% of its light. As a result of said choice of the orientation of the angle $\alpha$a, the above-mentioned relation H/D is given a measure regarding the number of times that a light beam originating from the LED and emitted at a given angle $\alpha$ collides with a wall of the light mixing chamber (and is reflected) before said light beam reaches the light-coupling edge area.

The lower limit $2\tan(\alpha_{max})=D/H$ in the above-mentioned formula is motivated by the fact that, at the location of the light-coupling edge area, the light beams originating from the LEDs comprise exactly the width of the light-coupling edge area. If $\alpha_{max}$ is smaller than the above-mentioned lower limit, then the light-coupling edge area is not entirely illuminated. If $\alpha_{max}$ is equal to the lower limit mentioned above, then no reflection of light at the walls of the light mixing chamber takes place in the plane formed by the angle $\alpha$ (=the plane at the location of the LED which extends transversely to the longitudinal direction of the light mixing chamber). If $\alpha_{max}$ is larger than said lower limit, reflections of light occur at the walls of the light mixing chamber. Although it has been found in experiments that these reflections, in principle, do not contribute to the mixing of the light in said plane, said reflections may help to mix the light in the plane formed by the angle $\alpha$ At each reflection, a (small) part of the light is lost. Therefore, the upper limit $\tan(\alpha_{max})=3D/H$ in the above-mentioned formula is motivated by the fact that it is amply sufficient if a part of the light beams emitted by the LEDs reflect maximally three times (3) at the wall of the light mixing chamber before said light beams reach the light-coupling edge area. By virtue of said measure, the uniformity of the distribution of the light emitted by the illumination system is further improved.

A synergetic effect is achieved by using a light mixing chamber having a height H and a width D, which, given the positioning and light distribution of the LEDs ($\alpha_{max}$ and $\alpha_{max}$), meet the two above-mentioned relations for H/P and H/D.

Preferably, the LEDs have a wide light distribution, particularly in the longitudinal direction of the light mixing chamber. A wide light distribution enhances the mixing of the light in (the longitudinal direction of) the light mixing chamber. It is particularly favorable if the value of the angle $\beta_{max}$ lies in the range from $60° \leq \beta_{max} \leq 80°$. The higher the value of $\beta_{max}$, the more light is emitted by the LEDs in the longitudinal direction of the light mixing chamber.

If the light-emitting diodes are provided in a wall of the light mixing chamber which is remote from the light-coupling edge area and extends parallel to the light-coupling edge area, it is particularly favorable if the value of the angle $\alpha_{max}$ lies in the range from $20 \leq \alpha_{max} \leq 50°$. If the light-emitting diodes are alternatively provided in a wall of the light mixing chamber transverse to the light-coupling edge areas, it is particularly favorable if the value of the angle $\alpha_{max}$ lies in the range from $60° \leq \alpha_{max} \leq 80°$.

In order to further enhance the mixing of light originating from the light mixing chamber, means for further mixing the light emitted by the plurality of LEDs of different colors may be situated between the light mixing chamber and the light-coupling edge area. For this purpose, a preferred embodiment of the illumination system is characterized in that a diffuser is present between the light mixing chamber and the light-coupling edge area. An additional advantage resides in that such a diffuser enables effects of non-identical light beam distributions of LEDs of different colors to be further averaged out.

A favorable embodiment of the illumination system is characterized in that the panel comprises two light-coupling edge areas, which are situated at opposite sides of the panel. In an alternative embodiment of the illumination system, the light-coupling edge area is situated at the side of the light-emitting panel that is opposite the light emission window (a so-called direct backlight).

The light-emitting diodes having different light-emission wavelengths are preferably clustered together in clusters comprising:

one blue, one green and one red light-emitting diode,
one blue, two green and one red light-emitting diodes,
one blue, one green, one amber and one red light-emitting diode, and
one blue, two green, one amber and one red light-emitting diodes.

Preferably, each of the light-emitting diodes comprises a luminous flux of at least 5 lm. LEDs having such a high output are alternatively referred to as LED power packages. The application of these high-efficiency, high-output LEDs has the specific advantage that the number of LEDs at a desired, comparatively high light output can be comparatively small. This has a favorable effect on the compactness and the efficiency of the illumination system to be manufactured.

Further advantages of the use of LEDs are: a comparatively very long service life, comparatively low energy costs and low maintenance costs of an illumination system comprising LEDs. In addition, the use of LEDs has the advantage that dynamic illumination possibilities are obtained.

In a further preferred embodiment, the illumination system comprises control electronics for changing the luminous flux of the light-emitting diodes. Suitable control electronics enables the desired illumination effects to be achieved and the uniformity of the coupled-out light to be improved. In addition, a suitable combination of LEDs enables white light to be obtained, and a desired color temperature can be obtained by control electronics.

Preferably, the LEDs are driven per string of serially coupled LEDs, whereby a string comprises LEDs of substantially the same light-emission wavelength. For example, all blue LEDs provided in a light mixing chamber in accordance with the invention jointly form one string. The advantage of driving the LEDs per string is that it results in a suitable drive voltage at a substantially equal luminous flux per string of LEDs.

These and other aspects of the invention will be apparent from and elucidated with reference to the embodiment(s) described hereinafter.

Figure 1A:
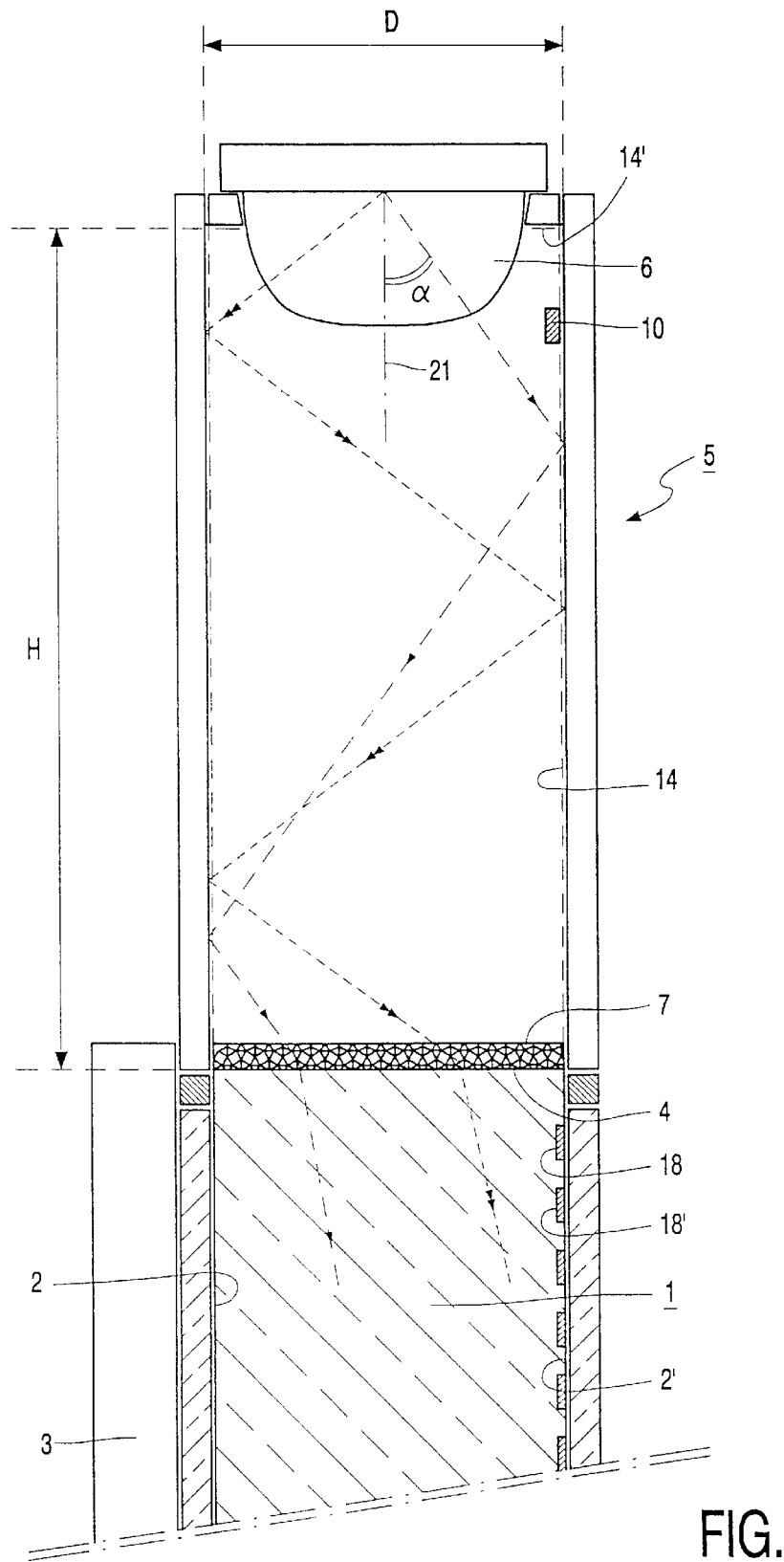
FIG. 1A is a cross-sectional view of an assembly of an illumination system and a display device comprising an embodiment of the illumination system in accordance with the invention.

The Figures are purely diagrammatic and not drawn to scale. Particularly for clarity, some dimensions are exaggerated strongly. In the Figures, like-reference numerals refer to like-parts whenever possible.

DETAILED DESCRIPTION OF THE INVENTION

FIG. 1A is a diagrammatic, cross-sectional view of an assembly of an illumination system and a display device comprising an embodiment of the illumination system in accordance with the invention. The illumination system comprises a light-emitting panel 1 of a light-transmitting material. The panel 1 is made of, for example, a synthetic resin, acryl, polycarbonate, PMMA, such as Perspex, or glass. In operation, light is transported through the panel 1 under the influence of total internal reflection. The light-emitting panel 1 has a light emission window 2 and a rear wall 2' opposite said light emission window 2. Between the light emission window 2 and the rear wall 2' there is a light-coupling edge area 4 for coupling light into the light-emitting panel 1. The illumination system further comprises a light mixing chamber 5 having a longitudinal direction 15 (see FIG. 3), and the illumination system is provided with a light source 6 having a longitudinal axis 21. The light mixing chamber 5 has a height H and a width D. The height H is measured at right angles to the light-coupling edge area 4, and the width D is measured at right angles to the longitudinal direction 15 (see FIG. 3) of the light mixing chamber 5.

For (image) display devices having a comparatively small picture diameter, one light mixing chamber is sufficient. For (image) display devices having a comparatively large picture diameter, generally two light mixing chambers are applied at two opposite sides of the light-emitting panel. The light mixing chamber(s) is/are situated, preferably, parallel to the long side(s) of the light-emitting panel.

The light mixing chamber 5 is associated with the light-coupling edge area 4, which is to be taken to mean in the claims and in the description of the invention that the light mixing chamber 5 is coupled to the light-coupling edge area 4 in such a manner that the light generated in the light mixing chamber 5 is optimally coupled into the light-emitting panel 1 via the light-coupling edge area 4. A light source 6 is accommodated in the light mixing chamber 5. In operation, light originating from the light source 6 is incident on the light-coupling edge area 4 and diffuses in the panel 1. The light originating from the light source 6 can reach the light-coupling edge area 4 either directly or via (multiple) reflections at the walls of the light mixing chamber 5. By way of example, FIG. 1A shows two possible light beams in the light mixing chamber. In the example shown in FIG. 1A, a diffuser 7 is situated between the light mixing chamber 5 and the light-coupling edge area 4, which diffuser 7 serves to enhance the mixing of the light originating from the light mixing chamber 5. Preferably, the diffuser 7 does not form an additional interface between the light mixing chamber 5 and the light-emitting panel 1. Furthermore, in FIG. 1A, the side walls of the light mixing chamber 5 are provided with a specularly and/or diffusely reflecting coating 14, 14' (also see FIGS. 4A and 4B). These coatings 14, 14' contribute to the mixing of the light originating from the light source 6.

The light mixing chamber 5 can be readily manufactured and comprises, for example, a housing of a suitably folded metal sheet.

In FIG. 1A, a wall of the light mixing chamber 5 extending transversely to the light-coupling edge area 4 is provided with a sensor 10 for measuring the optical properties of the light which, in operation, is emitted by the light source 6. This sensor 10 is coupled to control electronics (not shown in FIG. 1A) for suitably adapting the luminous flux of the light source 6 to the desired brightness and/or color point of the light to be coupled out by the light-emitting panel. By the sensor 10 and the control electronics, a feedback mechanism can be obtained by which both the quality and the quantity of the light to be coupled out of the light-emitting panel 1 can be influenced.

In the example shown in FIG. 1A, the rear wall 2' of the light-emitting panel 1 is provided with optical couplers 18, 18' for coupling light out of the light-emitting panel 1. These optical couplers 18, 18' comprise (patterns of) deformities and, for example, screen printed dots, wedges and/or ridges. The means are provided, for example, by etching, scribing or sandblasting in the rear wall 2' of the panel 1. In an alternative embodiment, the deformities are provided in the light-emission window 2 of the panel 1. The optical couplers 18, 18' serve as a secondary light source and couple light out of the light-emitting panel 1 by reflection, scattering and/or refraction.

In FIG. 1A, reference numeral 3 very diagrammatically denotes an LED panel. The assembly of the light-emitting panel 1, the light source 6 and the LCD panel 3 forms a display device for displaying, for example, (video) images.

Figure 1B:
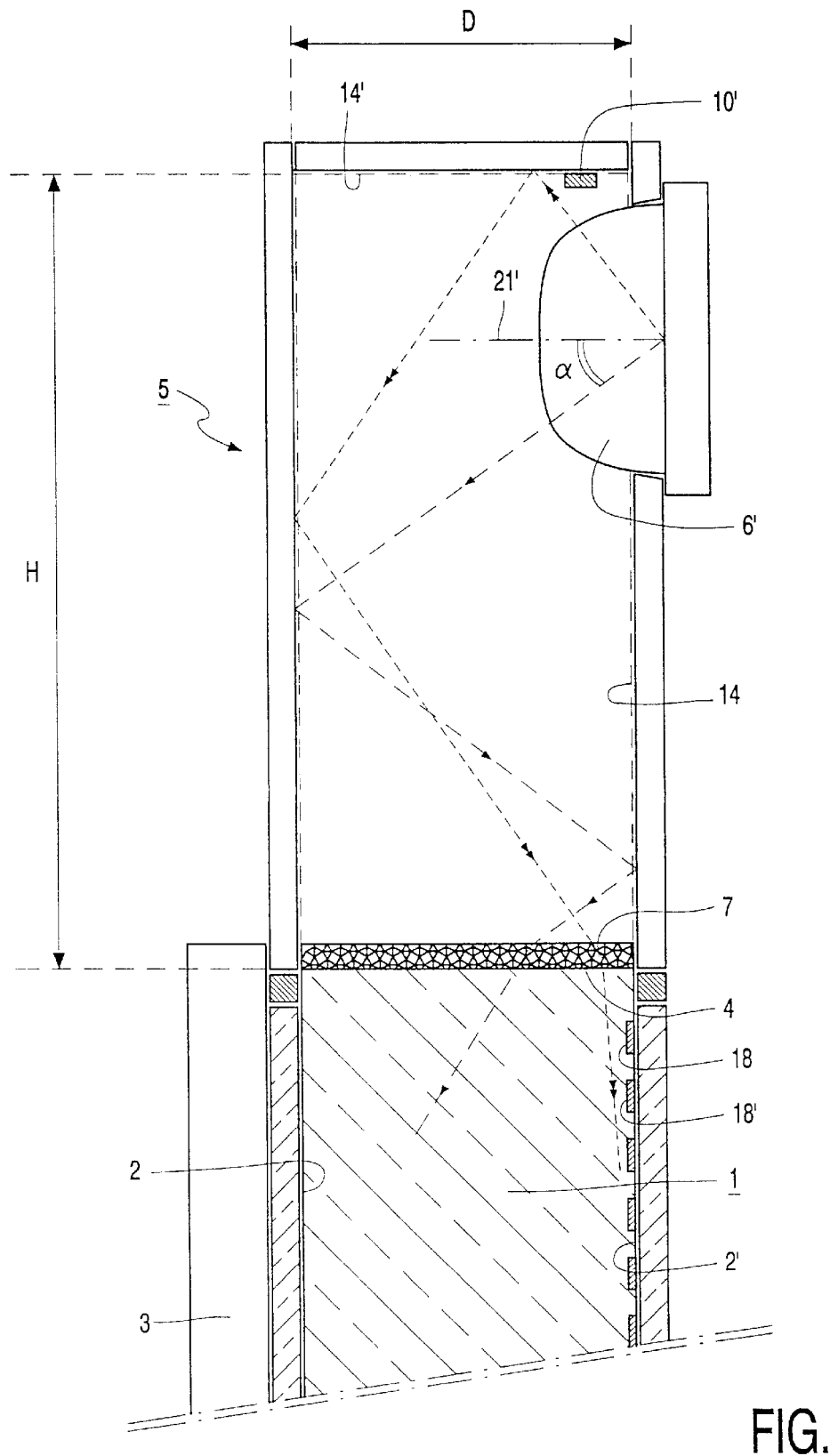
FIG. 1B is a cross-sectional view of an assembly of an illumination system and a display device comprising an alternative embodiment of the illumination system in accordance with the invention.

FIG. 1B is a diagrammatic, cross-sectional view of an assembly of an illumination system and a display device comprising an alternative embodiment of the illumination system in accordance with the invention. In this embodiment, the light source 6' is accommodated in a side wall of the light mixing chamber 5. The sensor 10' is provided, in this embodiment, in an (upper) wall of the light mixing chamber 5 facing away from the light-coupling edge area 4. The other parts bear the same reference numerals in FIGS. 1A and 1B.

In accordance with the measure of the invention, the light source 6, 6' comprises a plurality of clusters of light-emitting diodes having different light-emission wavelengths (see FIGS. 2A, 2B and 2C), which clusters are arranged at a pitch P with respect to each other, and the ratio between a height H of the light mixing chamber 5 and the pitch P of the clusters of the light-emitting diodes meets the relation:

$$0.1 \leq H/P \leq 10.$$

Figure 3:
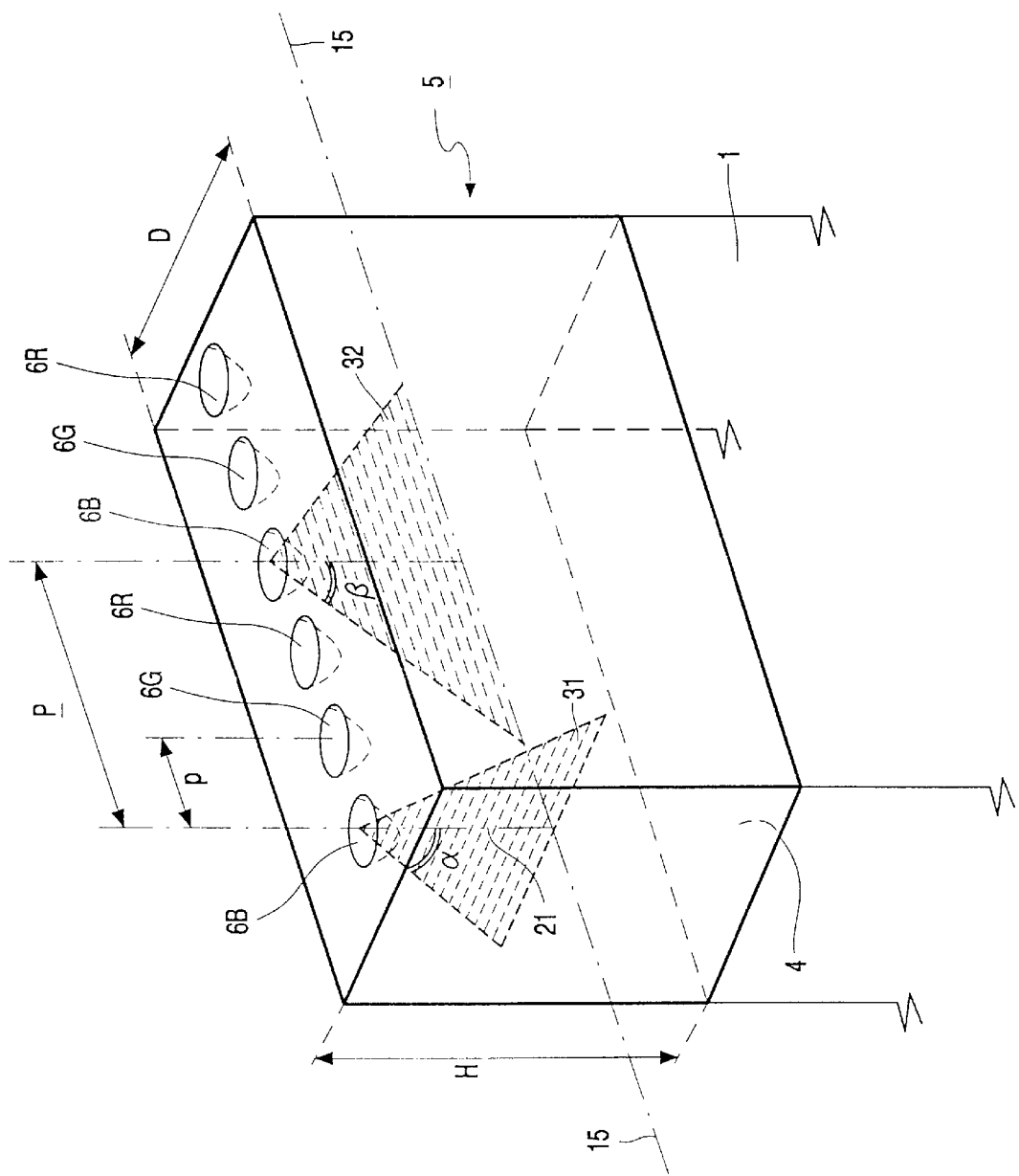
FIG. 3 is a perspective view of a detail of the illumination system shown in FIG. 1A.

A practically favorable size of the width D of the light mixing chamber 5 (the width D is measured transversely to the longitudinal direction 15 of the light mixing chamber 5, also see FIG. 3) lies in the range from $3 \leq D \leq 15$ mm. Experiments have shown that it is very suitable if the width D lies in the range from $3 \leq D \leq 5$ mm. In accordance with the invention, this results in a light mixing chamber 5 which, as regards the width, has smaller. dimensions than the known light mixing chamber. This has substantial advantages in the manufacture of an assembly of a display device and an illumination system in accordance with the invention.

The above-mentioned embodiment of an illumination system comprising a light mixing chamber provided with light-emitting diodes, where the light mixing chamber has a width D in the range from $3 \leq D \leq 15$ mm, preferably $3 \leq D \leq 5$ mm, can also be considered as an invention in itself.

A practically favorable dimension of the height H of the light mixing chamber 5 lies in the range from $10 \leq H \leq 20$ mm. Preferably, the LEDs are arranged at a pitch P in the range from $2 \leq P \leq 8$ mm with respect to each other. If P=3×p (see FIG. 2A), the pitch P of the clusters of LEDs lies in the range from $6 \leq P \leq 24$ mm. If P=4×p (see FIG. 2B), the pitch P of the clusters of LEDs lies in the range from $8 \leq P \leq 32$ mm. A particularly favorable light mixing chamber 5 has a height H≈15 mm and a pitch between the LEDs of p≈6 mm. As a result, the ratio of the height of the light mixing chamber 5 to the pitch of the clusters H/P≈0.83 (if P=3×p) or H/P≈0.63 (if P=4×p). Both ratios meet the relation:

$$0.2 \leq H/P \leq 2.$$

Figure 2A:
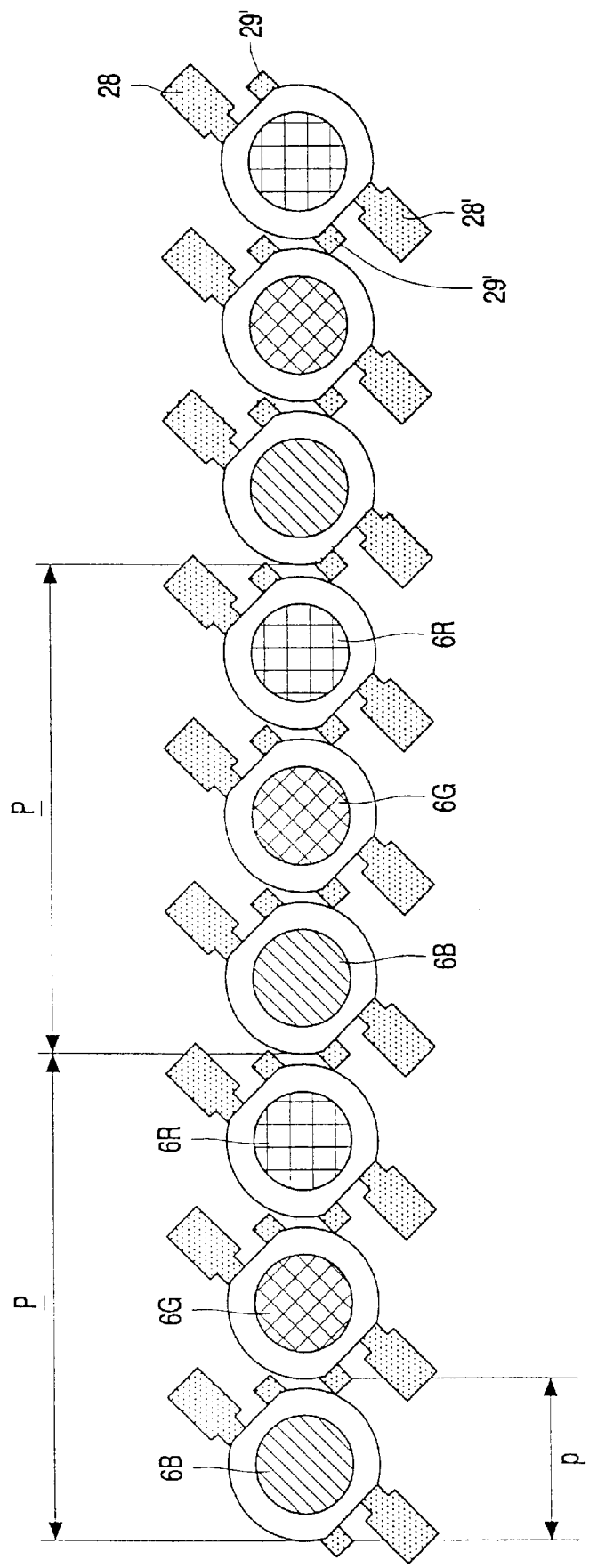
FIG. 2A is a plan view of a plurality of clusters of LEDs, each cluster comprising one blue, one green and one red LED arranged in a linear array.
Figure 2B:
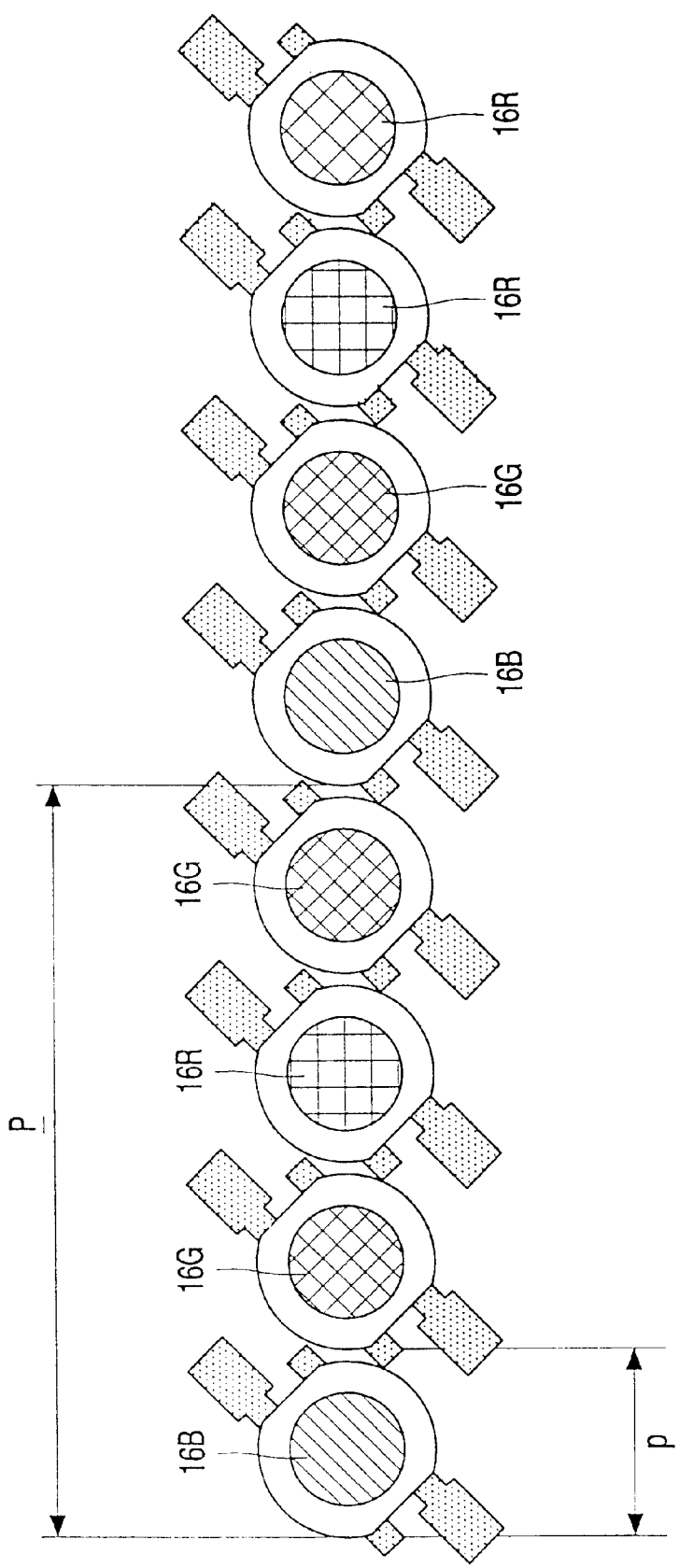
FIG. 2B is a plan view of a plurality of alternative clusters of LEDs, each cluster comprising a blue LED, two green LEDs and a red LED arranged in a linear array.
Figure 2C:
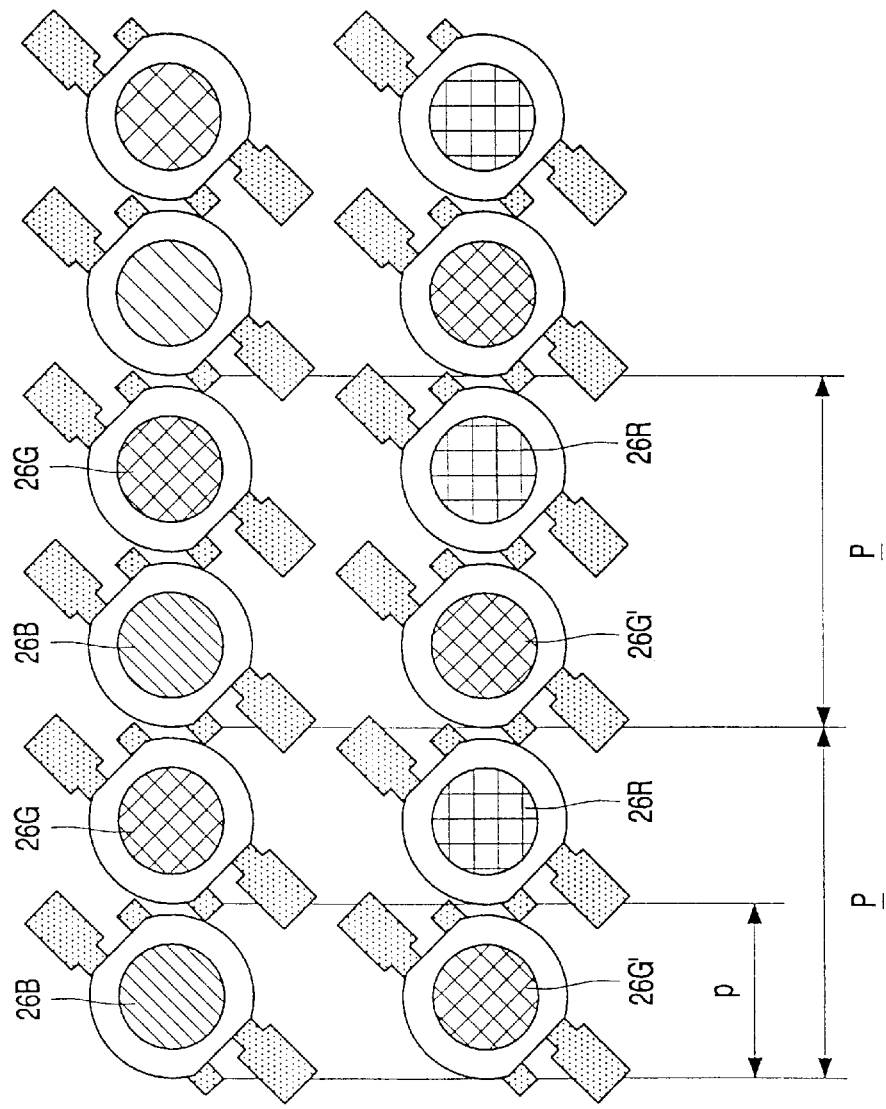
FIG. 2C is a plan view of a plurality of further alternative clusters of LEDs, each cluster comprising one blue LED, two green LEDs and one red LED arranged in two linear arrays.

FIGS. 2A–2C diagrammatically show various embodiments of stacks of LEDs 6B, 6G, 6R, . . . ; 16B, 16G, 16R, 16G', . . . ; 26B, 26G, 26R, 26G', . . . For clarity, the pitch of the of LEDs is indicated by an underlined capital P.

In FIG. 2A, a plurality of clusters of LEDs 6B, 6G, 6R, . . . is shown in plan view, each cluster comprising one blue LED 6B, one green LED 6G and one red LED 6R. The LEDs 6B, 6G, 6R, . . . are arranged in a linear array. The LEDs are provided with the customary mechanical and electrical connectors 28, 28', 29, 29'. The LEDs 6B, 6G, 6R, . . . are arranged at a distance with respect to each other which is indicated by the pitch p. The clusters of three LEDs 6B, 6G, 6R, . . . are arranged at a distance with respect to each other which is indicated by the pitch P. In the example shown in FIG. 2A, the LEDs 6B, 6G, 6R, . . . are arranged such that P=3×p.

An alternative embodiment of a stack of LEDs 16B, 16G, 16R, 16G', . . . is shown in a plan view in FIG. 2B, each cluster comprising one blue LED 16B, two green LEDs 16G, 16G' and one red LED 16R. The LEDs 16B, 16G, 16R, 16G', . . . are arranged in a linear array. An additional green LED 16G' is added to each one of the clusters of LEDs 16B, 16G, 16R because, in operation, green LEDs often emit insufficient light in proportion to the blue and red LEDs to reach the desired color setting (color temperature and/or white point). The LEDs 16B, 16G, 16R, 16G', . . . are arranged at a mutual distance indicated by the pitch p. The clusters of four LEDs 16B, 16G, 16R, 16G', . . . are arranged at a mutual distance indicated by the pitch P. In the example shown in FIG. 2B, the LEDs 16B, 16G, 16R, 16G', . . . are arranged such that P=4×p.

A further alternative embodiment of a stack of LEDs 26B, 26G, 26R, 26G', . . . is shown in a plan view in FIG. 2C, each cluster comprising one blue LED 26B, two green LEDs 26G, 26G' and one red LED 26R. The LEDs 26B, 26G, 26R, 26G', . . . are arranged in two linear arrays. Also in this case, one additional green LED 26G' is applied for each cluster of LEDs 26B, 26G, 26R. In the direction of one array, the blue and green LEDs 26B, 26G are arranged at a mutual distance indicated by the pitch p, and in the direction of the other array, the green and red LEDs 26G', 26R are arranged at a mutual distance indicated by the pitch p. The clusters of four LEDs 26B, 26G, 26R, 26G', . . . are arranged at a mutual distance indicated by the pitch P. In the example shown in FIG. 2C, the LEDs 26B, 26G, 26R, 26G', . . . are arranged such that P=2×p. The distance between the two arrays of LEDs is preferably chosen to be as small as possible. In a further alternative embodiment, also amber LEDs are employed.

The light source 6, 6' comprises a plurality of light-emitting diodes 6B, 6G, 6R, . . . ; 16B, 16G, 16R, 16G', . . . ; 26B, 26G, 26R, 26G', . . . , but may alternatively be a different light source, for example a discharge lamp. The source brightness of LEDs is many times that of fluorescent tubes. Furthermore, the efficiency with which light is coupled into the panel is higher with LEDs than with fluorescent tubes. The use of LEDs as the light source has the advantage that the LEDs may contact panels made of a synthetic resin. LEDs hardly emit heat in the direction of the light-emitting panel 1 and do not emit detrimental (UV) radiation either. The use of LEDs has the additional advantage that a coupling of the light originating from the LEDs into the panel can be dispensed with. The use of LEDs leads to a more compact illumination system.

The applied LEDs 6B, 6G, 6R, . . . ; 16B, 16G, 16R, 16G', . . . ; 26B, 26G, 26R, 26G', . . . are preferably LEDs which each have a luminous flux of at least 5 lm. LEDs having such a high output are alternatively referred to as LED power packages. Examples of power LEDs are "Barracuda" type LEDs (Lumileds). The luminous flux per LED is 15 lm for red LEDs, 13 lm for green LEDs, 5 lm for blue LEDs and 20 lm for amber LEDs. In an alternative embodiment, "Prometheus" type LEDs (Lumileds) are used, the luminous flux per LED being 35 lm for red LEDs, 20 lm for green LEDs, 8 lm for blue LEDs and 40 lm for amber LEDs.

Preferably, the LEDs are mounted on a (metal-core) printed circuit board. If power LEDs are mounted on such a (metal-core) printed circuit board, the heat generated by the LEDs can be readily dissipated by heat conduction via the PCB. In an interesting embodiment of the illumination system, the (metal-core) printed circuit board is in contact with the housing of the display device via a heat-conducting connection.

FIG. 3 is a very diagrammatic, perspective view of a detail of the illumination system shown in FIG. 1A. FIG. 3 shows the light mixing chamber 5 having a height H and a width D.

For orientation purposes, a longitudinal axis 15 extending in the longitudinal direction of the light mixing chamber 5 and parallel to the light-coupling edge area 4 is shown in the light mixing chamber 5. As regards the light source, the situation shown in FIG. 2A is selected, i.e. a plurality of clusters comprising one blue LED 6B, one green LED 6G and one red LED 6R. The LEDs 6B, 6G, 6R, . . . are arranged, parallel to the longitudinal direction 15 of the light mixing chamber 5, in an (upper) wall of the light mixing chamber 5 and at a mutual distance indicated by the pitch p. The clusters of three LEDs 6B, 6G, 6R, . . . are arranged at a mutual distance indicated by the pitch P. In the example shown in FIG. 3, the LEDs 6B, 6G, 6R, . . . are arranged such that P=3×p. For clarity, the capital letter P in FIG. 3 indicating the pitch of the clusters of LEDs is underlined.

The mixing of light originating from the plurality of LEDs 6B, 6G, 6R, . . . takes place in the light mixing chamber 5. From the light mixing chamber 5, light is coupled into the light-emitting panel 1 via the light-transmitting edge area 4.

FIG. 3 shows the longitudinal axis 21 of one of the LEDs (6B). Also the angle α is shown, which corresponds to the angle of light emission by the LED 6B. The angle α is measured in a plane which extends transversely to the longitudinal direction 15 of the light mixing chamber 5 (see the hatched triangle indicated by reference numeral 31 in FIG. 3). The angle α is measured with respect to the longitudinal axis 21 of the light-emitting diode 6B, i.e. α=0 (or 180°) along the longitudinal axis 21.

In accordance with a preferred embodiment of the illumination system, the ratio between the height H and a width D of the light mixing chamber 5 meets the relation:

$$\frac{1}{2\tan\alpha_{max}} \leq \frac{H}{D} \leq \frac{3}{\tan\alpha_{max}},$$

The value $\alpha_{max}$ represents the value of α at which the light-emitting diode 6B, 6G, 6R, . . . emits, in operation, 90% of its energy for values of α in the range from $-\alpha_{max} \leq \alpha \leq \alpha_{max}$.

As a result of said choice of the orientation of the angle α, the ratio H/D is given a measure regarding the number of times that a light beam originating from the LED 6B and emitted at a given angle α collides with a wall of the light mixing chamber 5 (and is reflected) before said light beam reaches the light-coupling edge area 4 (see the example of light beams in FIG. 1A).

The lower limit 2×tan($\alpha_{max}$)=D/H in the above-mentioned formula is dictated by the fact that, at the location of the light-coupling edge area, the width of the light beams originating from the LEDs is exactly equal to the width of the light-coupling edge area. The upper limit tan($\alpha_{max}$)=

3D/H in the above-mentioned formula is dictated by the fact that it is amply sufficient if a part of the light beams emitted by the LEDs reflects maximally three times (3) at the wall of the light mixing chamber before said light beams reach the light-coupling edge area.

Figure 4A:
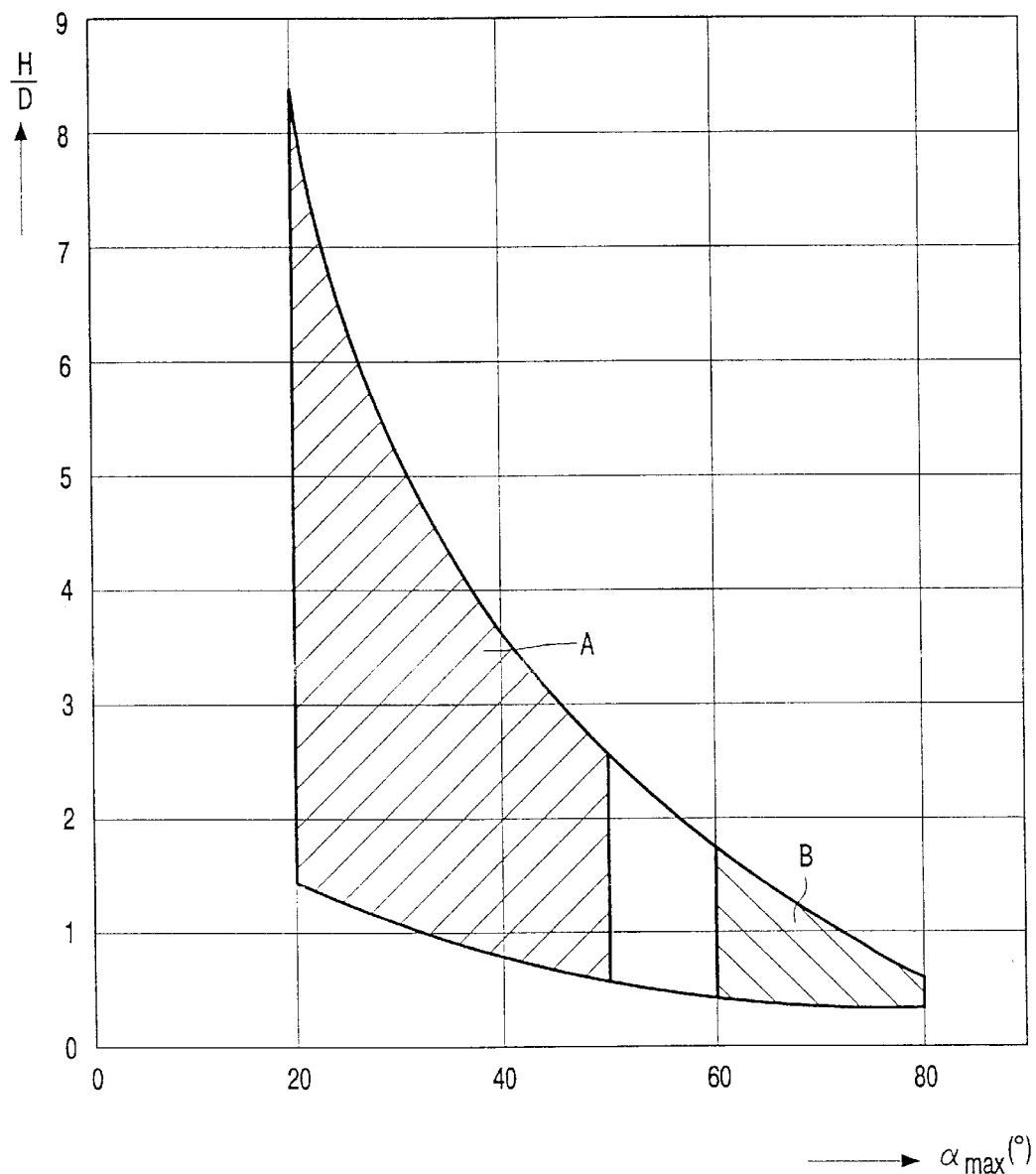
FIG. 4A shows the ratio H/P as a function of the angle $\alpha_{max}$.

FIG. 4A graphically shows the ratio H/D as a function of the angle $\alpha_{max}$. At values of $\alpha_{max} \leq 20°$, the dimensions of the illumination system become impracticably large. The larger the value of the angle $\alpha_{max}$, the smaller the ratio H/D can be chosen. At values of $\alpha_{max} > 80°$, the losses caused by multiple reflections of the light originating from the LEDs become excessively large.

Dependent upon the location of the LEDs 6; 6' in the light mixing chamber 5 with respect to the light-coupling edge area 4, preferred ranges for the values of $\alpha_{max}$ may be indicated. If the LEDs 6 are provided in a wall of the light mixing chamber 5 facing away from the light-coupling edge area 4 and extending parallel to the light-coupling edge area 4 (see the situation shown in FIG. 1A), the value of the angle $\alpha_{max}$ preferably lies in the range from $20 \leq \alpha_{max} \leq 50°$ (see the hatched area referenced A in FIG. 4A). In this situation, it is favorable if the light beams originating from the LEDs are comparatively narrow in the plane formed by the angle $\alpha$ (see FIG. 3), so that the light is incident on the light-coupling edge area with few or no reflections at the walls of the light mixing chamber 5. In said range, the ratio H/D ranges between $1.37 \leq H/D \leq 8.25$ for $\alpha_{max}=20°$, and between $0.42 \leq H/D \leq 2.5$ for $\alpha_{max}=50°$.

In an alternative situation, the LEDs 6' are provided in a wall of the light mixing chamber 5 at right angles to the light-coupling edge area 4 (see the situation shown in FIG. 1B), and the value of the angle $\alpha_{max}$ preferably lies in the range from $60 \leq \alpha_{max} \leq 80°$ (see the hatched area referenced B in FIG. 4A). In this situation, comparatively wide light beams sooner reach the light-coupling edge area 4. In said range, the ratio H/D ranges between $0.29 \leq H/D \leq 1.73$ for $\alpha_{max}=60°$, and between $0.088 \leq H/D \leq 0.53$ for $\alpha_{max}=80°$.

In FIG. 3, the angle $\beta$ is also shown, which angle corresponds to the angle of light emission by the LED 6B. The angle $\beta$ is measured in a plane which extends parallel to the longitudinal direction 15 of the light mixing chamber 5 (see the hatched triangle referenced 32 in FIG. 3). The angle $\beta$ is measured with respect to the relevant longitudinal axis of the light-emitting diode, i.e. $\alpha=0$ (or 180°) along the longitudinal axis.

In accordance with an alternative preferred embodiment of the illumination system, the ratio between the height H of the light mixing chamber 5 and the pitch P of the clusters of light-emitting diodes 6B, 6G, 6R, . . . meets the relation:

$$\frac{1}{2\tan\beta_{max}} \leq \frac{H}{P} \leq \frac{2}{\tan\beta_{max}},$$

The value $\beta_{max}$ represents the value of $\beta$ at which the light-emitting diode 6B, 6G, 6R, . . . emits, in operation, 90% of its energy for values of $\beta$ in the range from $-\beta_{max} \leq \beta \leq \beta_{max}$.

As a result of said choice of the orientation of the angle $\beta$, the ratio H/P is given a measure regarding the degree of mixing of the light of various colors originating from the LEDs in adjoining clusters.

Figure 4B:
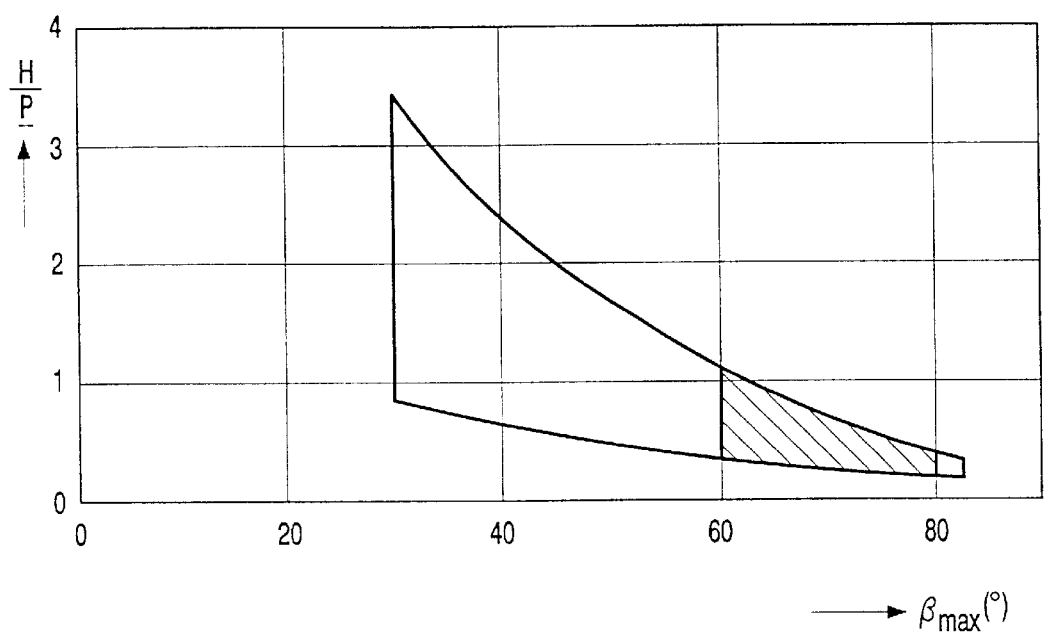
FIG. 4B shows the ratio H/D as a function of the angle $\beta_{max}$.

FIG. 4B graphically shows the ratio H/P as a function of the angle $\beta_{max}$. For clarity, the capital letter P in FIG. 4B, which denotes the pitch of the clusters of LEDs, is underlined. For values of $\beta_{max}<30°$, the dimensions of the illumination system become impracticably large. The larger the value of the angle $\beta_{max}$, the smaller the ratio H/P can be chosen. For values of $\beta_{max}>85°$ C., the losses resulting from multiple reflections of light originating from LEDs become excessive.

A particularly favorable value of the angle $\beta_{max}$ lies in the range from $60 \leq \beta_{max} \leq 80°$. This preferred range is indicated by the hatched area in FIG. 4B. In this area, the ratio of H/P ranges between $0.29 \leq H/P \leq 1.15$ for $\beta_{max}=60°$, and between $0.09 \leq H/P \leq 0.35$ for $\alpha_{max}=80°$.

Figure 5A:
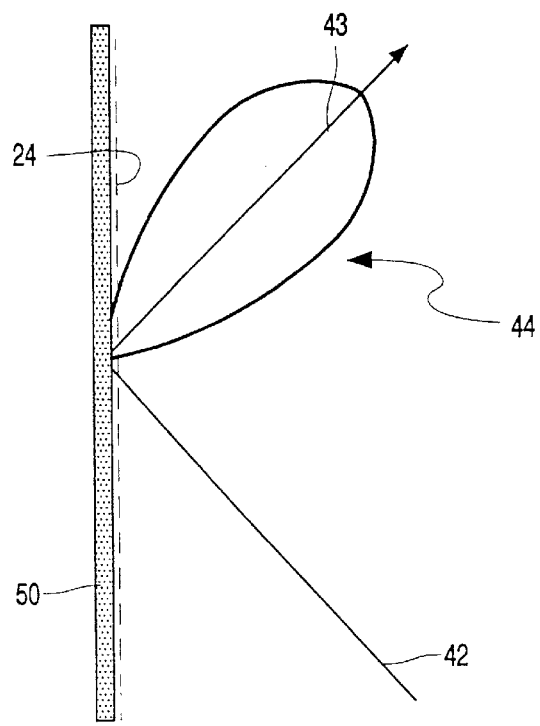
FIG. 5A shows the specular and diffuse reflection at one of the wall of the light mixing chamber.

FIG. 5A diagrammatically shows specular and diffuse reflection at a wall 50 of the light mixing chamber 5. If the wall is mirror bright, an incoming light beam 42 is reflected in known manner in a light beam 43 (angle of incidence=exit angle). In order to render the wall 50 mirror-bright, said wall may be provided with a mirror-bright coating 24, for example MIRO-II from Alanod. If the wall is provided with a partly diffusely reflecting coating 24, for example MIRO-V from Alanod, a light beam distribution upon reflection is obtained as indicated by distribution 44.

Figure 5B:
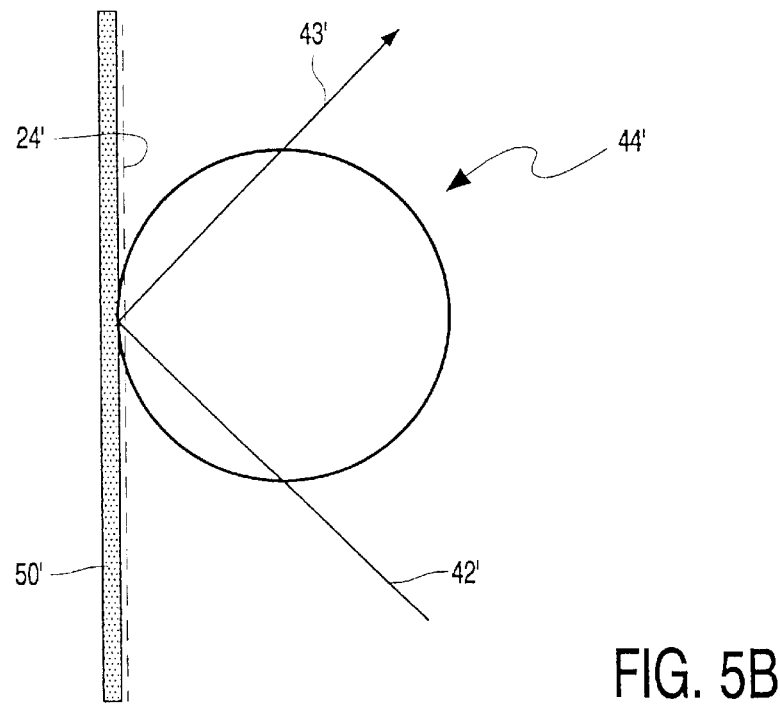
FIG. 5B shows the specular and diffuse reflection at another wall of the light mixing chamber.

FIG. 5B diagrammatically shows specular and diffuse reflection at a wall 50' of the light mixing chamber 5. For comparison, the drawing shows the mirror-bright situation (light beam 42' which is reflected and continues as light beam 43') and a situation wherein the wall 50' diffusely reflects light of a white color (diagrammatically represented by the distribution 44'). In the latter case, the wall 50' is preferably provided with a diffuser (not shown) containing, for example, calcium halophosphate, strontium halophosphate and/or calcium pyrophosphate. Such a diffuser is preferably applied as a lacquer, wherein a binder, for example a fluorocopolymer, such as THV, as well as a solvent (for example Mibk) are applied. The use of such a diffuser in combination with said binder has the advantage that firing-out is not necessary and that the reflection has at least substantially the same high value throughout the visible range and a large part of the UV range. Accordingly, these diffusers can very suitably be used in coatings where the light is frequently reflected, because preferential absorption, and color differences which may be caused thereby, are effectively counteracted by using these diffusers. In addition, further additives may be added to this lacquer mixture, which exhibit, for example, an improved liquid or mixing behavior.

Figure 6A:
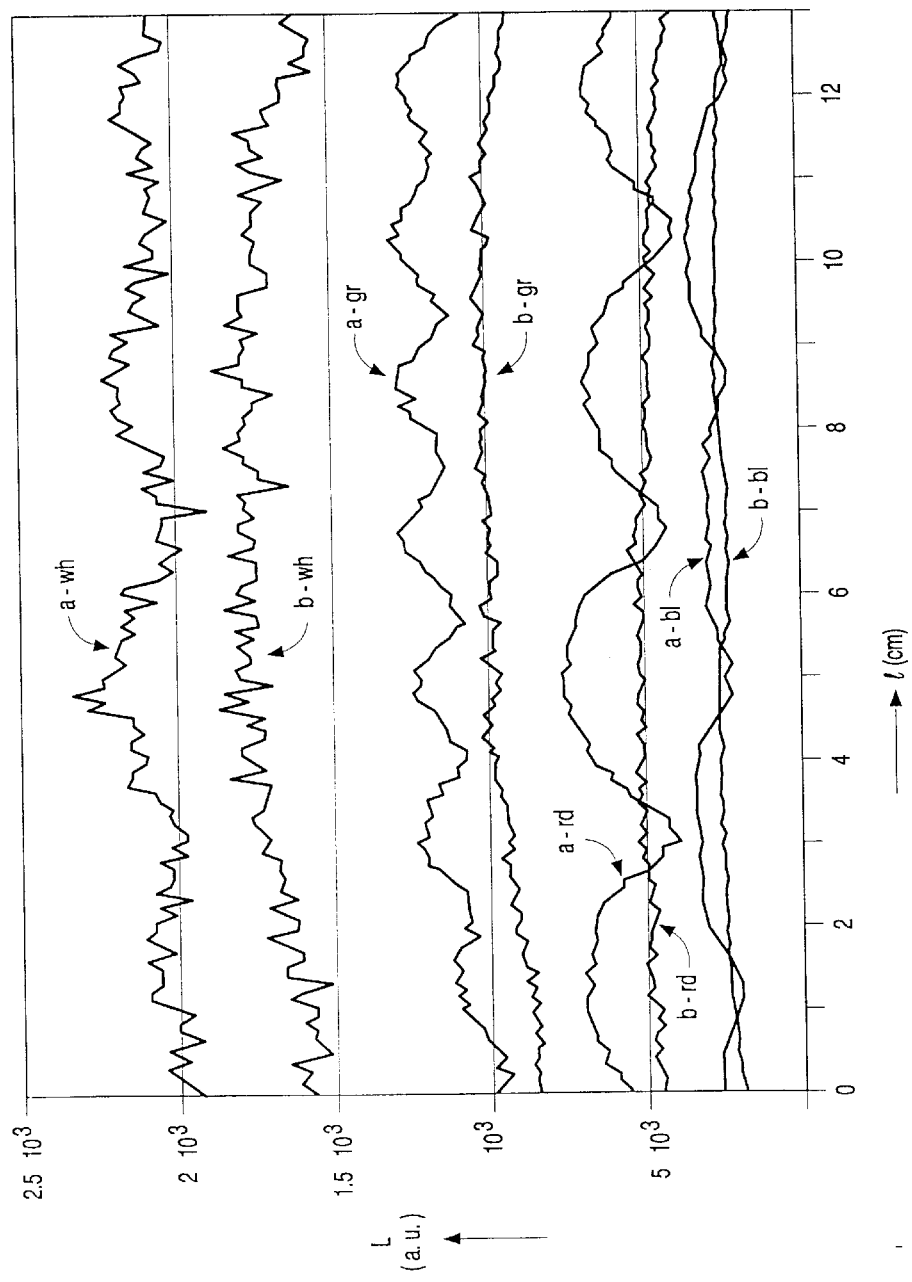
FIG. 6A shows the luminance for the three basic colors blue, green and red and for white light, measured at the luminous window of an illumination system without a light mixing chamber at distances of 2 and 10 mm from the light-coupling edge area.

FIG. 6A shows the luminance L in arbitrary units (a.u.) for the three basic colors blue, green and red and for white light, measured at the light emission window of an illumination system without a light mixing chamber, at a distance of 2 mm and of 10 mm from the light-coupling edge area. To carry out the measurements, a plurality of clusters of blue, green and red LEDs is arranged, as a linear array, so as to be in direct contact with the light-emitting panel's light-coupling edge area. In this example, the length of the light-emitting panel is l=13 cm, measured parallel to the light-coupling edge area. The luminance measurements at a distance of 2 mm from the light-coupling edge area are indicated by (a), and the luminance measurements at a distance of 10 mm are indicated by (b). First, only the blue LEDs are energized and the luminance L is measured as a function of the length l, the result being shown in the curves a-bl and b-bl. Next, only the green LEDs are energized, and the luminance L is measured, the result being shown in the curves a-gr and b-gr. Subsequently, only the red LEDs are energized, and the luminance L is measured, the result being shown in the curves a-rd and b-rd. The peaks and the dips in these curves clearly show where the LEDs are situated. Finally, the blue, green and red LEDs are simultaneously energized, and the luminance L is measured, the result being shown in the curves a-wh and b-wh. The slight curvature visible in the curves, shown in FIG. 6A, over the length l, is caused by the comparatively small dimensions of the light-emission window.

Figure 6B:
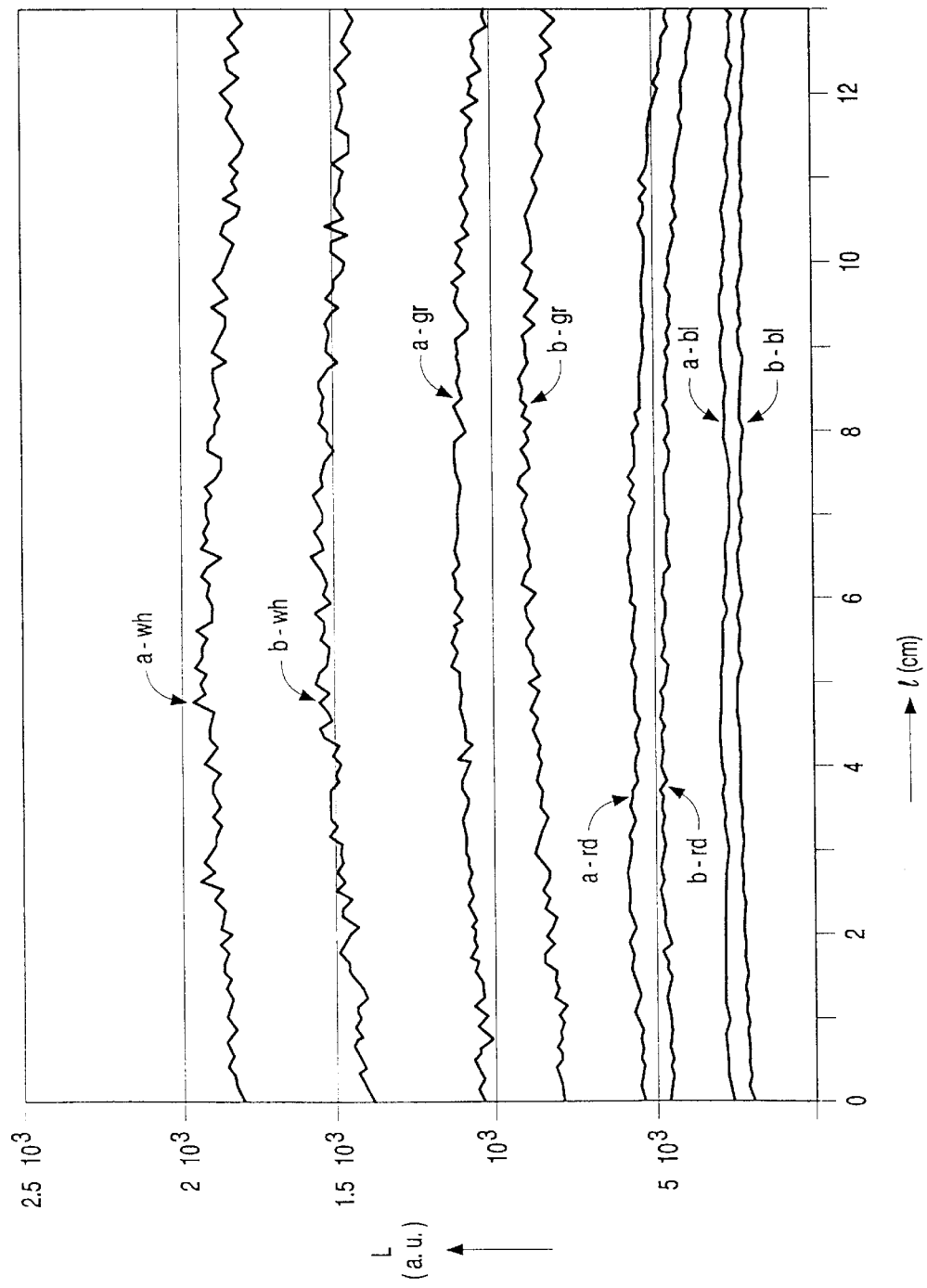
FIG. 6B shows the luminance for the three basic colors blue, green and red and for white light, measured at the luminous window of an illumination system provided with a light mixing chamber in accordance with the invention having a height of 15 mm, at distances of 2 and 10 mm from the light-coupling edge area.

FIG. 6B shows the luminance L in arbitrary units (a.u.) for the three basic colors blue, green and red and for white light, measured at the light-emission window of an illumination system provided with a light mixing chamber in accordance with the invention having a height of 15 mm, at distances of 2 and 10 mm from the light-coupling edge area. To carry out the measurements, the blue, green and red LEDs 6B, 6G, 6R, . . . are accommodated in the light mixing chamber 5 as shown in the situation of FIG. 1A (also see FIG. 3). In this example, the light-emitting panel 1 has a length l=13 cm, measured parallel to the longitudinal direction 15 of the light mixing chamber 5. First, only the blue LEDs 6B, . . . are energized and the luminance L is measured as a function of the length l, the result being shown in the curves a-bl and b-bl. Next, only the green LEDs 6G, . . . are energized, and the luminance L is measured, the result being shown in curves a-gr and b-gr. Subsequently, only the red LEDs 6R, . . . are energized, and the luminance L is measured, the result being shown in curves a-rd and b-rd. Finally, the blue, green and red LEDs 6B, 6G, 6R, . . . are simultaneously energized, and the luminance L is measured, the result being shown in curves a-wh and b-wh. Compared to FIG. 6A, the curves as shown in FIG. 6B, wherein the luminance is measured close to the light-coupling edge area, clearly show that the presence of a light mixing chamber as described in this invention contributes substantially to the mixing of the light emitted through the light-emission window of the light-emitting panel. As a result, an illumination system is obtained wherein the light distribution over the whole light emission window of the light-emitting panel is sufficiently uniform at every location, also in the proximity of the light source. The use of the illumination system in accordance with the invention enables the display device to be illuminated sufficiently uniformly. The slight curvature visible in the curves, as shown in FIG. 6B, over the length l is caused by the comparatively small dimensions of the light-emission window.

It will be clear that, within the scope of the invention, many variations are possible to those skilled in the art. For example, the distribution of the light emitted by the LED may be dependent upon the angle at which emission takes place. By suitably choosing the light distribution of the LED, the amount of light emitted in the forward direction (in the direction of the longitudinal axis of the LED) can be reduced in favor of light that is emitted at an angle with the longitudinal axis of the LED. Thus, it is conceivable that the light distribution of the LED has two lobes which are oriented, at predetermined angles, with respect to the longitudinal axis. It is particularly favorable if these lobes extend parallel to the longitudinal direction of the light mixing chamber.

The scope of protection of the invention is not limited to the examples given hereinabove. The invention is embodied in each novel characteristic and each combination of characteristics. Reference numerals in the claims do not limit the scope of protection thereof. The use of the verb "to comprise" and its conjugations does not exclude the presence of elements other than those stated in the claims. The use of the article "a" or "an" in front of an element does not exclude the presence of a plurality of such elements.

What is claimed is:

1. An illumination system for illuminating a display device (3), comprising
   a light-emitting panel (1) having a light-emission window (2) and at least one light-coupling edge area (4) for coupling light into the light-emitting panel (1), and
   a light mixing chamber (5) with a longitudinal direction (15) which extends parallel to the light-coupling edge area (4), which light mixing chamber is provided with a light source (6; 6'), the light mixing chamber (5) being associated with the light-coupling edge area (4), characterized in that
   the light source (6, 6') comprises a plurality of clusters of light-emitting diodes (6B, 6G, 6R, . . . ; 16B, 16G, 16R, 16G', . . . ; 26B, 26G, 26R, 26G', . . . ) having different light-emission wavelengths, said clusters being arranged at a pitch (P) with respect to each other, and
   the ratio between a height (H) of the light mixing chamber (5) and the pitch (P) of the clusters of the light-emitting diodes (6B, 6G, 6R, . . . ; 16B, 16G, 16R, 16G', . . . ; 26B, 26G, 26R, 26G', . . . ) meets the relation:

$0.1 \leq H/P \leq 10,$ the height H of the light mixing chamber (5) being measured at right angles to the light-coupling edge area (4).

2. An illumination system as claimed in claim 1, characterized in that the ratio between the height (H) of the light mixing chamber (5) and the pitch (P) of the clusters of the light-emitting diodes (6B, 6G, 6R, . . . ; 16B, 16G, 16R, 16G', . . . ; 26B, 26G, 26R, 26G', . . . ) meets the relation:

$0.2 \leq H/P \leq 2.$

3. An illumination system as claimed in claim 1 or 2, characterized in that the ratio between the height (H) of the light mixing chamber (5) and the pitch (P) of the clusters of the light-emitting diodes (6B, 6G, 6R, . . . ; 16B, 16G, 16R, 16G', . . . ; 26B, 26G, 26R 26G', . . . ) meets the relation:

$$\frac{1}{2\tan\beta_{max}} \leq \frac{H}{P} \leq \frac{2}{\tan\beta_{max}},$$

where $\beta$ is the light emission angle of the light-emitting diode (6B, 6G, 6R, . . . ; 16B, 16G, 16R, 16G', . . . ; 26B, 26G, 26R, 26G', . . . ) in a plane parallel to the longitudinal direction (15) of the light mixing chamber (5) and measured with respect to a longitudinal axis (21) of the light-emitting diode (6B, 6G, 6R, . . . ; 16B, 16G, 16R, 16G', . . . ; 26B, 26G 26R, 26G', . . . ), and
   where $\beta_{max}$ is the maximum value of $\beta$ at which the light-emitting diode (6B, 6G, 6R, . . . ; 16B, 16G, 16R, 16G', . . . ; 262, 26G, 26R, 26G', . . . ) emits, in operation, 90% of its energy for values of $\beta$ at which $|\beta| \leq \beta_{max}$.

4. An illumination system as claimed in claim 3, characterized in that the value of the angle $\beta_{max}$ lies in the range from $60 \leq \beta_{max} \leq 80°$.

5. An illumination system as claimed in claim 1 or 2, characterized in that the ratio between the height (H) and a width (D) of the light mixing chamber (5) meets the relation:

$$\frac{1}{2\tan\alpha_{max}} \leq \frac{H}{D} \leq \frac{3}{\tan\alpha_{max}},$$

where D is the width of the light mixing chamber (5) measured at right angles to the longitudinal direction (15) of the light mixing chamber (5),
   where $\alpha$ is the light emission angle of the light-emitting diode (6B, 6G, 6R, . . . ; 16B, 16G, 16R, 16G', . . . ; 26B, 26G, 26R, 26G', . . . ) in a plane transverse to the longitudinal direction (15) of the light mixing chamber (5) and measured with respect to a longitudinal axis (21; 21') of the light-emitting diode (6B, 6G, 6R, . . . ; 16B, 16G, 16R, 16G', . . . ; 26B, 26R, 26G', . . . ), and where $\alpha_{max}$ is the maximum value of $\alpha$ at which the light-emitting diode (6B, 6G, 6R, . . . ; 16B, 16G, 16R, 16G', . . . ; 26B, 26G, 26R, 26G', . . . ) emits, in operation, 90% of its energy for values of $\alpha$ at which $|\alpha| \leq \alpha_{max}$.

6. An illumination system as claimed in claim 5, characterized in that
the value of the angle $\alpha_{max}$ lies in the range from $20 \leq \alpha_{max} \leq 50°$ if the light-emitting diodes (6) are provided in a wall of the light mixing chamber (5) which is remote from the light-coupling edge area (4) and which extends parallel to said light-coupling edge area (4), or
the value of the angle $\alpha_{max}$ lies in the range from $60° \leq \alpha_{max} \leq 80°$ if the light-emitting diodes (6') are provided in a wall of the light mixing chamber (5) transversely to the light-coupling edge area (4).

7. An illumination system as claimed in claim 1 or 2, characterized in that the width (D) of the light mixing chamber (5), measured transversely to the longitudinal direction (15) of the light mixing chamber (5), lies in the range from $3 \leq D \leq 15$ mm.

8. An illumination system as claimed in claim 7, characterized in that the width (D) lies in the range from $3 \leq D \leq 5$ mm.

9. An illumination system as claimed in claim 1 or 2, characterized in that each of the clusters of light-emitting diodes (6B, 6G, 6R, . . . ; 16B, 16G, 16R, 16G', . . . ; 26B, 26G, 26R, 26G', . . . ) having different light emission wavelengths is selected from the group formed by
one blue (6B), one green (6G) and one red (6R) light-emitting diode,
one blue (16B; 26B), two green (16G, 16G'; 26G, 26G') and one red (16R; 26R) light-emitting diodes,
one blue, one green, one amber and one red light-emitting diode, and
one blue, two green, one amber and one red light-emitting diodes.

10. An illumination system as claimed in claim 1 or 2, characterized in that a diffuser (7) is present between the light mixing chamber (5) and the light-coupling edge area (4).

11. An illumination system as claimed in claim 1 or 2, characterized in that the panel comprises two light-coupling edge areas (4) which are situated at opposite sides of the light-emitting panel (1).

12. An illumination system as claimed in claim 1 or 2, characterized in that each of the light-emitting diodes (6B, 6G, 6R, . . . ; 16B, 16G, 16R, 16G', . . . ; 26B, 26G, 26R, 26G', . . . ) comprises a luminous flux of at least 5 lm.

13. An illumination system as claimed in claim 1 or 2, characterized in that the illumination system comprises control electronics for changing the luminous flux of the light-emitting diodes (6B, 6G, 6R, . . . ; 16B, 16G, 16R, 16G', . . . ; 26B, 26G, 26R, 26G', . . . ).

14. An illumination system for illuminating a display device (3), comprising
a light-emitting panel (1) having a light-emission window (2) and at least one light-coupling edge area (4) for coupling light into the light-emitting panel (1);
a light mixing chamber (5) with a longitudinal direction (15) which extends parallel to the light-coupling edge area (4), which light mixing chamber is provided with a light source (6; 6'), the light mixing chamber (5) being associated with the light-coupling edge area (4) and a height H of the light mixing chamber (5) being measured at right angles to the light-coupling edge area (4), wherein said light source (6, 6') includes a plurality of clusters of 26B, 26G, 26R, 26G', . . . ) having different light-emission wavelengths, said clusters being arranged at a pitch (P) with respect to each other, and
wherein a ratio between the height (H) of the light mixing chamber (5) and the pitch (P) of the clusters of the light-emitting diodes (6B, 6G, 6R, . . . ; 16B, 16G, 16R, 16G', . . . ; 26B, 26G, 26R, 26G', . . . ) meets the relation:

$$\frac{1}{2\tan\beta_{max}} \leq \frac{H}{P} \leq \frac{2}{\tan\beta_{max}},$$

where $\beta$ is the light emission angle of the light-emitting diode (6B, 6G, 6R, . . . ; 16B, 16G, 16R, 16G', . . . ; 26B, 26G, 26R, 26G', . . . ) in a plane parallel to the longitudinal direction (15) of the light mixing chamber (5) and measured with respect to a longitudinal axis (21) of the light-emitting diode (6B, 6G, 6R, . . . ; 16B, 16G, 16R, 16G', . . . ; 26B, 26G, 26R, 26G', . . . ), and
where $\beta_{max}$ is the maximum value of $\beta$ at which the light-emitting diode (6B, 6G, 6R, . . . ; 16B, 16G, 16R, 16G', . . . ; 262, 26G, 26R, 26G', . . . ) emits, in operation 90% of its energy for values of $\beta$ at which $|\beta| \leq \beta_{max}$.

15. An illumination system for illuminating a display device (3), comprising
a light-emitting panel (1) having a light-emission window (2) and at least one light-coupling edge area (4) for coupling light into the light-emitting panel (1);
a light mixing chamber (5) with a longitudinal direction (15) which extends parallel to the light-coupling edge area (4), which light mixing chamber is provided with a light source (6; 6'), the light mixing chamber (5) being associated with the light-coupling edge area (4) and a height H of the light mixing chamber (5) being measured at right angles to the light-coupling edge area (4), wherein said light source (6, 6') includes a plurality of clusters of light-emitting diodes (6B, 6G, 6R, . . . ; 16B, 16G, 16R, 16G', . . . ; 26B, 26G, 26R, 26G', . . . ) having different light-emission wavelengths, said clusters being arranged at a pitch (P) with respect to each other, and
wherein a ratio between the height (H) and a width (D) of the light mixing chamber (5) meets the relation:

$$\frac{1}{2\tan\alpha_{max}} \leq \frac{H}{D} \leq \frac{3}{\tan\alpha_{max}},$$

where D is the width of the light mixing chamber (5) measured at right angles to the longitudinal direction (15) of the light mixing chamber (5),
where $\alpha$ is the light emission angle of the light-emitting diode (6B, 6G, 6R, . . . ; 16B, 16G, 16R, 16G', . . . ; 26B, 26G, 26R, 26G', . . . ) in a plane transverse to the longitudinal direction (15) of the light mixing chamber (5) and measured with respect to a longitudinal axis (21; 21') of the light-emitting diode (6B, 6G, 6R, . . . ; 16B, 16G, 16R, 16G', . . . ; 26B, 26G, 26R, 26G', . . . ), and
where $\alpha_{max}$ is the maximum value of $\alpha$ at which the light-emitting diode (6B, 6G, 6R, . . . ; 16B, 16G, 16R, 16G', . . . ; 26B, 26G, 26R, 26G', . . . ) emits, in operation 90% of its energy for values of $\alpha$ at which $|\alpha| \leq \alpha_{max}$.

* * * * *